Feb. 6, 1934.　　　F. H. LE JEUNE　　　1,945,647
METHOD OF MAKING WIRE WHEELS
Filed June 10, 1929　　2 Sheets-Sheet 1

Inventor
Frank H. Le Jeune
By Blackmore, Spencer & Hub—
Attorneys

Feb. 6, 1934.　　　　F. H. LE JEUNE　　　　1,945,647
METHOD OF MAKING WIRE WHEELS
Filed June 10, 1929　　　2 Sheets-Sheet 2

Inventor
Frank H. Le Jeune
By Blackmore, Spencer & Flick
Attorneys

Patented Feb. 6, 1934

1,945,647

UNITED STATES PATENT OFFICE 1,945,647

METHOD OF MAKING WIRE WHEELS

Frank H. Le Jeune, Jackson, Mich., assignor, by mesne assignments, to Kelsey-Hayes Wheel Corporation, a corporation of New York Application June 10, 1929. Serial No. 369,605

2 Claims. (Cl. 29—159.02)

This invention relates to wheels and methods of making the same and has particular reference to wire wheels or wheels having wire metallic spokes and the methods of making these wheels.

In the past, wheels of the type to which the invention relates have been built up or constructed by passing the spoke through an opening in either the hub or rim and then fastening the spoke at its opposite end to secure proper tension in the spoke.

In the present invention the usual hub and rim are mounted in a frame and the spoke constructed in two pieces which may be termed halves, although they need not necessarily be separated in the middle and the term half is used to express the two spoke portions. The ends of the spokes are preferably formed into conical heads while the metal is cold. The two halves are inserted in tapered openings in the hub and rim which tapered openings receive and hold the tapered heads, while the two ends extend toward each other in abutting relation or are juxtaposed. Electrodes are then applied to the spoke halves at the abutting ends and a current passed through the abutting ends to gradually form a butt weld near the middle of the spoke where the cross section of the two parts is uniform. This type of weld is preferred to a weld at the spoke end and the rim, where the parts are not of uniform cross section.

When the spokes are applied to the hub and rim, either all the inner or all outer spokes are welded in position and the hub and the one set of spokes then the hub and rim preferably pressed away from each other to put the spokes under tension; i. e. the assembly is distorted by putting tension on the welded row of spokes. The spokes on the opposite side are then welded in place and the pressure on the hub and rim then released to allow the tension to spread itself between both inner and outer spokes.

When all the spokes have been welded in position under secure tension, a suitable stripping tool may be used to strip down the flash from around the spokes where the weld is formed.

The center lines of the conical heads of the spoke halves are preferably on a line corresponding to a line passing through the axis of the wheel while the spokes themselves are bent at an angle to the head and are not on a line passing through the wheel axis. The heads are accordingly formed at a proper angle to the spoke to allow for the proper positioning of the spokes in accordance with the above.

Figures 1, 2:
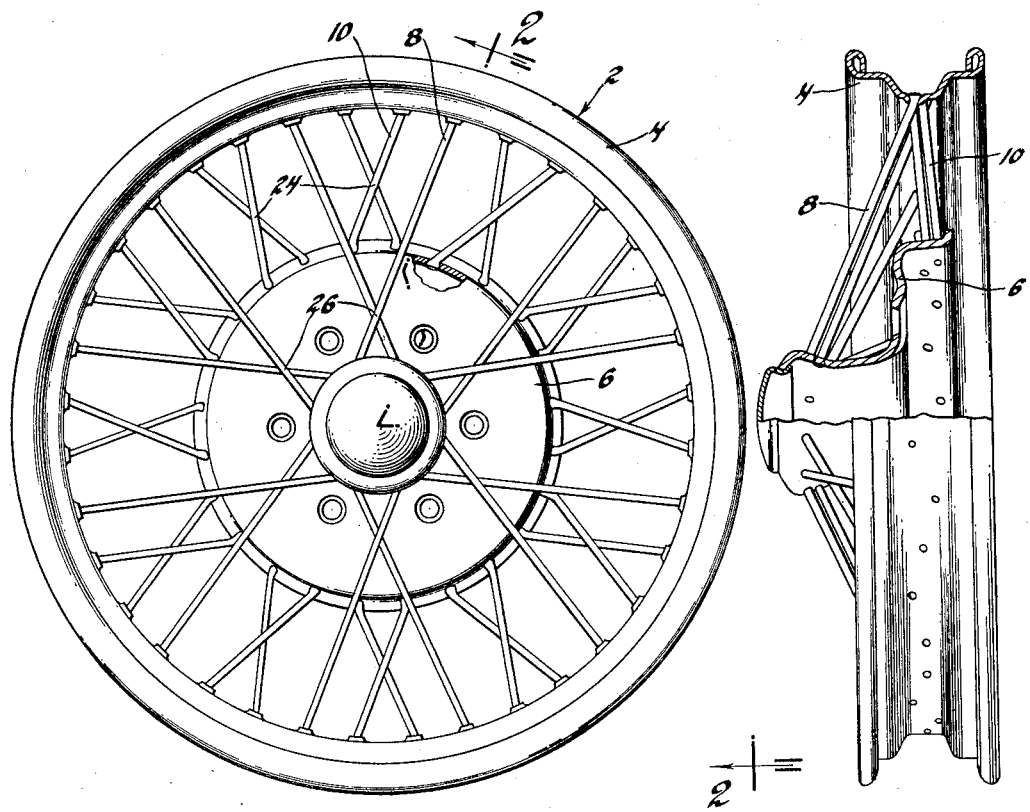
Fig. 1 shows the side view of a completed wheel constructed in accordance with the invention, with parts broken away and shown in section to illustrate the invention.
Fig. 2 is a section on the line 2—2 of Fig. 1.

Referring to the drawings the numeral 2 indicates the wheel of the invention as a whole. The rim is indicated at 4 and the hub at 6, while 8 and 10 indicate the outer and inner wheel spokes respectively.

Figure 3:
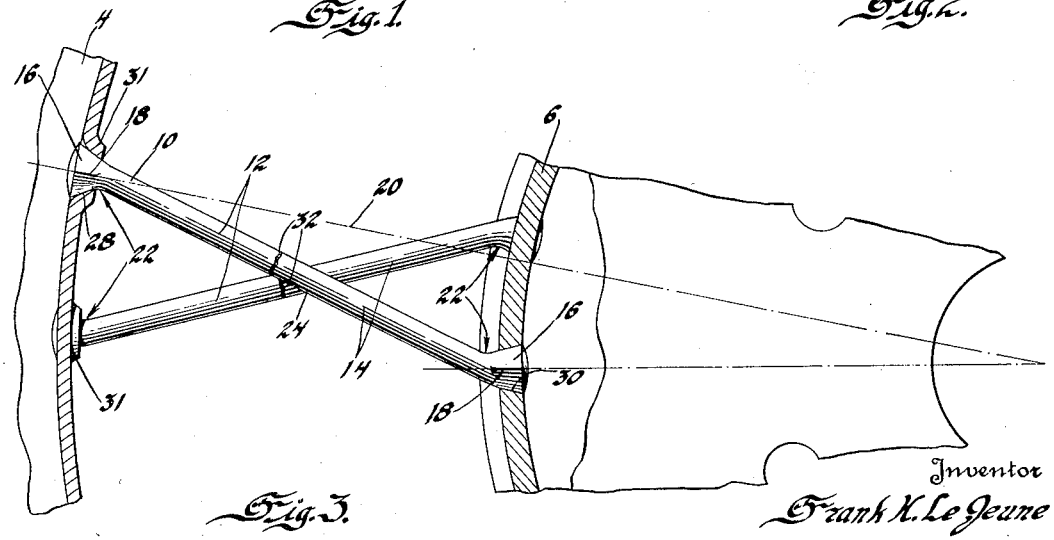
Fig. 3 is an enlarged detailed sectional view showing the invention on a larger scale.
Figure 4:
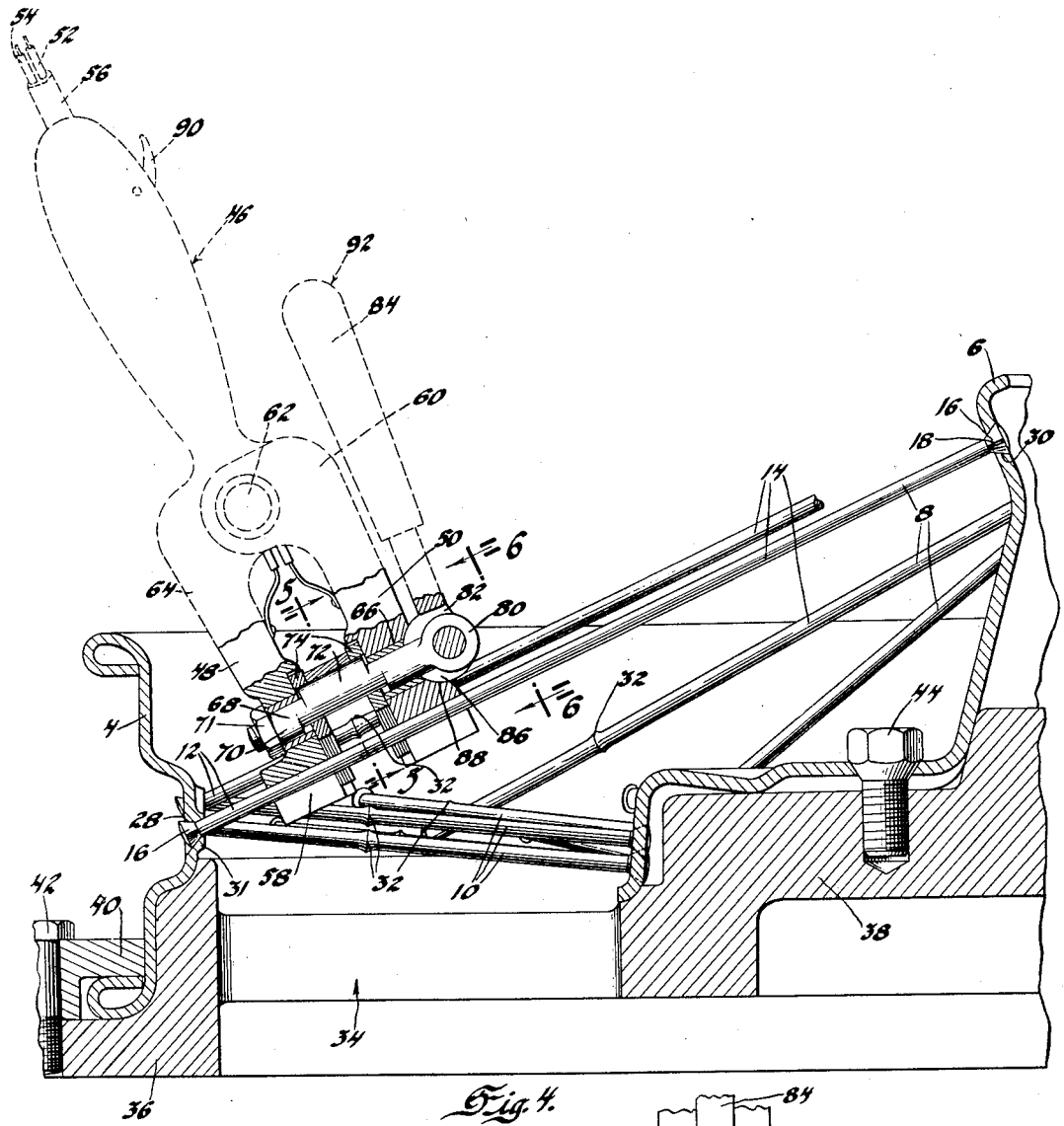
Fig. 4 is a view of a portion of the wheel in the assembly frame for welding.

Both the outer and inner spokes are composed of two halves or portions indicated at 12 and 14 respectively in Figs. 3 and 4.

Each spoke half has an enlarged conical or conical-polygonal head 16 with the center line 18 of the cone passing through the axis of the wheel as indicated at 20 in Fig. 3. It will also be noted that the heads 16 are formed or bent at an angle as shown at 22, so that the main spoke portion 8 is on a line which does not pass through the axis of the wheel. This will bring about a crossing of the spokes 8 or 10 as shown at 24 and 26 in Figs. 1 and 3. The spokes may be left straight as shown in Fig. 4.

The rim 4 and the hub 6 are provided with a plurality of tapered openings 28 and 30 as is best shown in Fig. 3. These openings are preferably conical, but may, if desired, be made polygonal and may be equipped with a surrounding boss 31, which is preferable but may be omitted in practice. The heads 16 are received in the openings 28 and 30, as is best shown in Fig. 3, with the conical heads 16 wedging themselves against the sides of the tapered openings 28 and 30. The structure of Fig. 3 while shown as applied in connection with the inner spokes 10 is also applied in the same way to the outer spokes 8.

The spoke half 12 from the rim 4 projects inwardly and is juxtaposed or abuts with respect to the end of the spoke half or portion 14 from the hub 6. At their abutting portions a butt weld 32 is formed to rigidly and integrally unite the spoke halves 12 and 14 together to form the single spoke 10. When the spoke halves are applied they are a little too long in order to allow for the proper forming of a butt weld. They are pressed toward each other and the current turned on and allowed to continue until the metal flows and a weld is formed. The current is then turned off and the pressing of the spoke ends toward each other is continued so as to get the conical heads into their conical seats and to press the spoke halves toward each other until they jamb owing to the fact that the metal will no longer flow.

Figure 5:
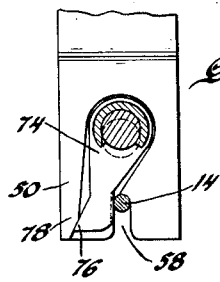
Fig. 5 is a section on the line 5—5 of Fig. 4.
Figure 6:
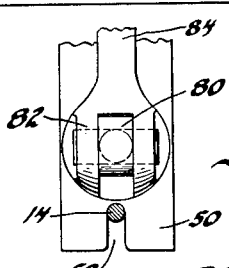
Fig. 6 is a small detailed view on the line 6—6 of Fig. 4.

While any suitable means or method may be used to make or construct a wheel, one such method is indicated in a more or less schematic or diagrammatic way in Figs. 4-6 inclusive.

The frame in which the rim 4 and hub 6 is mounted is indicated at 34. The frame comprises the outer portion 36 to mount the rim and the inner portion 38 to receive the hub 6. The rim 4 is secured in position by means of blocks or fingers 40 held to the frame portion 36 by means of the machine bolts 42. The hub 6 is secured to the inner frame portion 38 by means of the machine bolts 44 which pass through the usual openings adapted to receive the bolts for securing the removable hub to the fixed hub. The inner spoke halves 14 on the hub are of course placed in the openings 30 prior to the positioning of the hub on the frame portion 8. When the parts are assembled in the frame and the spoke halves or portions 12 and 14 inserted in their respective openings, the ends are placed in abutting relation or juxtaposed and the device indicated as a whole at 46 is applied. The device 46 comprises the electrodes 48 and 50 which will receive their current from the wires 52 and 54, enclosed in the usual insulation 56. The electrodes are forked at their ends as indicated at 58 in order that they may be positioned over the abutting ends of the spoke halves 12 and 14.

The electrode 50 has an insulated arm 60 which is pivoted as at 62 to an insulated arm 64 of the electrode 48. Both electrodes 48 and 50 are provided with openings 66 in which there is adapted to be received the journalled portions 68 of a rotatable shaft 70. In practice a coil spring is placed around the shaft 70 between the nut 71 (which will then be spaced from the device 46) and the electrode 48 which spring is under compression when the parts are in the position shown in Fig. 4 and will constantly urge the electrodes toward each other, or exert a continual pressure on the spoke ends toward each other. The shaft 70 has an eccentric portion 72 at its mid portion, the purpose of which is to operate the fingers 74 mounted thereon. The fingers 74 project downwardly past the fork 58 and their ends 76 are adapted to strike against a shoulder 78 formed on the ends of the electrodes 48 and 50. As the eccentric 72 is operated it will pull the fingers 74 upwardly and cause the end or point 76 to strike against the shoulder 78 and to produce a cam action to lightly hold the spoke halves 12 or 14 in position in the electrode.

After the eccentric 72 has been operated to cause the fingers 74 to very lightly grip the spoke halves 12 and 14, the shaft 70 is operated to swing the electrodes 48 and 50 on the pivot 62 to rigidly and firmly bring the ends of the spoke halves 12 and 14 into abutting relation and compress the coil spring around the end of the shaft 68. The means by which this is accomplished is as follows:

The end of the shaft 70 is provided with an eye 80 received in the fork 82 of a hand operated lever 84. The fork 82 has the cam end 86 which operates on a cam shoulder 88 formed on the electrode 60 or on a suitably insulated washer. In the position shown in Fig. 4 the eccentric 72 has operated the fingers 74 to lightly grip the spoke ends 12 and 14 while the handle 84 has been swung to position to pull the electrodes 48 and 50 together and to tightly hold the spoke ends 12 and 14 into abutting relation. A switch indicated at 90 in Fig. 4 is now operated to turn on the current which will pass from one electrode through the abutting spoke ends and into the other electrode to heat the spokes and cause a weld to be formed as indicated at 32. After the weld has been suitably formed the current is thrown off by the operation of the switch 90. The handle 84 is rotated at right angles to the plane of the paper to cause the eccentric 72 to release the fingers 74. The tool 46 may now be withdrawn and applied to a new set of spokes. If desired, the handle or lever 84 may first be swung in the plane of the paper and then later swung at right angles thereto to release the tool 46 from the weld, but this is not to be preferred and the extra operation is usually unnecessary.

While the tool 46 has been explained sufficiently to understand the operation it will be understood that suitable insulation is applied at all necessary places to provide for proper safety of the operator. For instance the handle or lever 84 may have a covering 92 of insulating material and suitable blocks of insulation are enclosed between the electrodes 48 and 50 and between the arms 60 and 64.

One or more operators may of course work simultaneously on the same wheel and from both sides thereof, the number of operators on a wheel being limited only by the practicability of applying tools 46 to the spokes.

After the weld 32 has been formed the flash or protuberance may be removed by a suitable tool.

I claim:

1. The method of making a wire wheel having inner and outer rows of spokes, which comprises providing hub and rim members with spoke receiving openings, providing complemental spoke sections, each having a head at one end thereof, placing the hub member within the rim member, inserting the complemental spoke sections with their heads rearmost through the openings in the hub and rim members and toward each other, welding the adjacent ends of the complemental spoke sections forming the spokes of one row, relatively moving the hub and rim members to effect tensioning of the welded spokes, then welding the adjacent ends of the complemental spoke sections forming the other row of spokes, and then releasing the wheel to allow tensioning of both rows of spokes.

2. The method of making a wire wheel having a rim member and a hub member concentrically arranged with respect to the rim member and connected thereto by inner and outer rows of spokes, which consists in providing spoke receiving openings in the hub and rim members, providing complemental spoke sections, each having a head at one end thereof, inserting the complemental spoke sections through the openings in the hub and rim members with the head portions thereof engaging the latter members, placing the hub member within the rim member, welding the adjacent ends of the complemental spoke sections forming the spokes of one row, relatively moving the hub and rim members in an axial direction to tension the welded spokes and to urge the adjacent ends of the remaining complemental spoke sections in abutting relationship, welding the adjacent ends of the latter complemental spoke sections forming the other row of spokes while the aforesaid welded spokes are under tension, and then releasing the wheel to allow tensioning of both rows of spokes.

FRANK H. LE JEUNE.